United States Patent Office 3,736,345
Patented May 29, 1973

3,736,345
STEROID-LIKE COMPOUNDS AND METHOD OF SYNTHESIS
Marinus Los, Princeton, N.J., assignor to American Cyanamid Company, Stamford, Conn.
No Drawing. Continuation-in-part of abandoned application Ser. No. 834,492, June 18, 1969. This application May 18, 1971, Ser. No. 144,687
Int. Cl. C07c 121/02, 121/48
U.S. Cl. 260—465 D
3 Claims

ABSTRACT OF THE DISCLOSURE

This invention relates to novel steroid-like compounds, a method for the synthesis thereof as intermediates for preparing other steroids and for the use of such compounds as estrogenic, androgenic or antiovulatory agents in the treatment of domestic and laboratory animals.

This application is a continuation-in-part of my application Ser. No. 834,492, filed June 18, 1969, now abandoned.

My copending application Ser. No. 708,498, filed Feb. 27, 1968, now U.S. Pat. 3,565,958 describes starting materials of the present invention.

DESCRIPTION OF THE INVENTION

This invention relates particularly to novel steroid-like compounds having the formula:

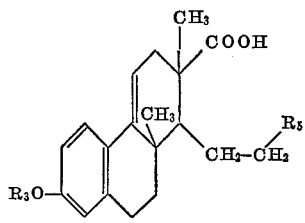

wherein $R_3$ is as described above and $R_5$ is selected from the group consisting of —CN and —COOH;

They are prepared from steroid-like compounds having the formula:

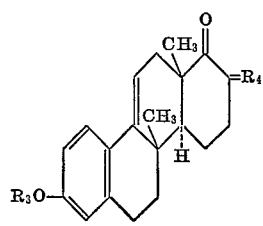

wherein $R_3$ is lower alkyl having from 1 to 4 carbon atoms and $R_4$ is NOH.

The present compounds are converted into the following steroid compounds:

(A)

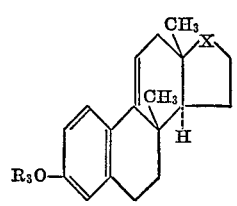

wherein $R_3$ is as described above and X is selected from the group consisting of

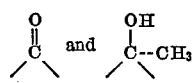

(B)

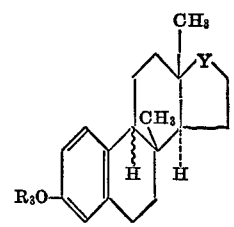

wherein $R_3$ is as described above and Y is selected from the group consisting of

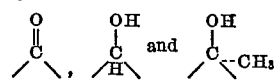

(C)

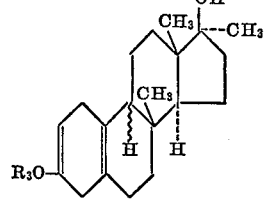

wherein $R_3$ is as described above; and (D)

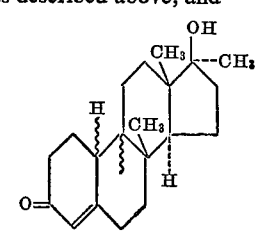

The present invention also describes a method of synthesizing the above-identified compounds and to the use thereof as estrogenic, androgenic or antiovulatory agents in the treatment of laboratory and domestic animals including, rats, rabbits, guinea pigs, goats, sheep, swine and the like.

PREFERRED EMBODIMENT OF THE INVENTION

The compounds of the present invention can be synthesized from the starting materials identified by Formulas I and IV on the Synthesis Diagram, sheet 1, hereinafter. In these formulae and those proceeding from said starting materials and graphically illustrated on Synthesis Diagram, sheets 1 and 4, R is a member selected from the group consisting of t-butoxy-(O—C—$(CH_3)_3$), ethylenedioxy

and tetrahydropyranyloxy

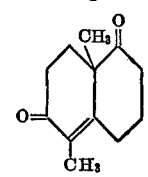

$R_1$ is hydrogen or lower alkyl, such as methyl, ethyl, propyl, isopropyl or butyl and $R_2$ is oxygen or hydroxyl. Briefly, the enedione having the formula can be converted to the Formula IV compound wherein R is ethylenedioxy by treatment thereof with excess ethylene glycol and p-toluenesulfonic acid in an inert solvent such as benzene at an elevated temperature. Reaction of the thus formed monoketal with ethylformate and an alkali metal methoxide gives the hydroxymethylene ketone which, when treated with N-methylaniline yields the Formula I compound wherein R is ethylenedioxy.

Treatment of the above-identified enedione with an alkali metal borohydride in the presence of a lower alkanol gives the naphthalenone corresponding to Formula IV wherein R is hydroxyl. The alcohol is then dissolved in methylene chloride and the solution treated with isobutylene in the presence of an acid catalyst to obtain the Formula IV compound wherein R is t-butoxy. The corresponding tetrahydropyranyloxy compound is made from the alcohol by dissolving the same in tetrahydrofuran and treating the solution with the dihydropyran containing phosphorus oxychloride. Preparation of Formula I compounds wherein R is t-butoxy or tetrahydropyranyloxy is then achieved in the same manner as described above for the Formula I compound in which R is ethylenedioxy. This involves preparation of the formyl compound and treatment thereof with N-methylaniline.

The allyl compounds (II) are obtained by alkylation of the N-methylanilinomethylene compound (I) with an allyl halide such as allyl bromide. Hydrolysis of (II) under strongly basic conditions then gives the desired unblocked ketone (III) which, when ozonized, yields by selective cleavage of the allyl double bond the corresponding aldehyde (VI). The unblocked ketone (III) can also be obtained directly from the enone (IV) by treatment of (IV) with a strong base such as potassium t-butoxide or sodium hydride in an inert solvent, such as, t-butanol or dimethoxyethane followed by allyl bromide at an elevated temperature. Reaction of the thus formed product (III) in tetrahydrofuran with an alkali metal chlorate and osmium tetroxide gives the hemiketal (V) which is converted to the aldehyde (VI) by reaction with an alkali metal periodate and further treatment of the aldehyde (VI) with m-methoxyphenyl magnesium bromide gives the hemiketal (VII, $R_1=H$) in good yield.

The hemiketal (VII) is also prepared from the starting material (I) by the route involving reaction of the anion of (I) with m-methoxyphenacyl bromide, preferably at about 0° C. to obtain the anilino compound (VIII) which, on hydrolysis in strong base gives the unblocked ketone (X). The reaction is preferably run at an elevated temperature in a lower alkylene glycol. If the reaction is terminated after a short period of reflux about 1 to 3 hours, a major portion of the product obtained will be the formyl compound (IX), however, if the reaction is run for approximately 6 hours, the unblocked ketone (X) is obtained in high yield. Reduction of this latter compound with hydrogen in acetic acid and a catalyst such as palladium gives the ketone (XI). The reaction is preferably run at an elevated temperature between about 50° and 90° C. and at a super atmospheric pressure. Acid hydrolysis of the thus formed product (XI) yields the diketone or ketoalcohol (XV). The ketone (XI) may also be obtained from the hemiketal (VII) by reduction of the same with hydrogen and a palladium catalyst in acetic acid. In addition to the previous route described for the preparation of (VII), such product can be obtained by catalytic reduction of the diketone (X). When this product (VII,

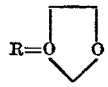

$R_1=CH_3$ or $C_2H_5$) is then hydrolyzed with aqueous acetic acid at an elevated temperature the hemiketal (XII) is formed. When (VII, R=t-butoxy or tetrahydropyranyloxy and $R_1=H$, methyl or ethyl) is hydrolyzed by mineral acid, then (XVI) is the product. When the compound (XII) is then subject to treatment with hot acetic acid-acetic anhydride mixture the diketone (XIII) is formed. This product is also obtained when (VII, R=ethylenedioxy and $R_1$ is H or methyl) is treated with acetic acid and acetic anhydride giving the acetoxyketone which is hyrolyzed to the diketone (XIII) in aqueous acetic acid. Conversion of the diketone (XIII) to the trans-styrene (XIV) is accomplished by reaction thereof with a strong acid such as p-toluene sulfonic acid at an elevated temperature in an inert solvent. Hydrogenation of the trans-styrene (XIV) yields the enedione (XV, $R_2=$oxygen) identical with that formed by acid hydrolysis of (XI, R=ethylenedioxy). When the hemiketal (XVI) is reduced with hydrogen in the presence of a catalyst (XV, $R_2=$hydroxyl) is obtained.

The enedione (XV, $R_2=$oxygen) is then reduced with sodium borohydride to the unsaturated keto alcohol (XVII). Further reduction of (XVII) with hydrogen in the presence of a palladium catalyst yields the keto alcohol (XVIII) which is readily oxidized to trans-dione (XIX) by mild oxidation with Jones' reagent. Cyclization of (XIX) by mineral acid at an elevated temperature gives the D-homosteroid (XX).

While synthesis diagram sheets I, II and III and the above description refers primarily to the preparation of methoxy substituted compounds, for example, the 3-methoxy-D-homosteroid (XX) it is, of course, recognized that other lower alkoxy homologues ($C_1$–$C_4$) of the above compounds can be prepared using the appropriate starting materials. Employing m-lower alkoxyphenylmagnesium bromide or m-lower alkoxyphenacyl bromides in the syntheses shown on Synthesis Diagram, sheet I, leads to the corresponding lower alkoxy derivatives of VII and VIII. Synthesis Diagram (IV), which is directed to compounds of the present invention and the synthesis route employed, therefore shows the 3 position substituted by a lower alkoxy group ($R_3$).

Now referring to Synthesis Diagram, sheet IV, the D-homosteroid (XX) is converted in good yield to oximinoketone (XXI) by reaction with an alkyl nitrite such as isoamyl nitrite, butyl nitrite or the like, in the presence of a strong base such as an alkali metal hydride or t-butoxide. In practice it is generally preferable to dissolve the D-homosteroid (XX) in t-butanol under an inert atmosphere such as argon, helium or nitrogen prior to treatment with the alkyl nitrite. The reaction is generally run at about room temperature and the reaction mixture permitted to stir for several hours before being diluted with water and acidified with acid such as a hydrohalide, sulfuric acid or acetic acid. Separation of the oximinoketone from the reaction mixture can then be achieved by extraction with an organic solvent such as methylene chloride, drying, and evaporation of the solvent.

The compounds of this invention are prepared by a second order Bechkmann re-arrangement of the oximinotosyl halide in the presence of a strong base such as sodium or potassium hydroxide. The reaction is preferably run in a solvent such as a water miscible ether, for example, tetrahydrofuran, dimethoxyethane or dioxane, and at an elevated temperature preferably between about 37° C. and 75° C. This reaction yields the cyano acid (XXII) which on base hydrolysis gives the diacid (XXIII). This reaction is conveniently carried out by admixing the cyano acid (XXII) with an aqueous solution of strong base such as an alkali metal hydroxide, heating said mixture to reflux temperature for several hours and acidifying said mixture with a mineral acid such as sulfuric or hydrochloric and to obtain the diacid (XXIII). Pyrolysis of the diacid under reduced pressure in the presence of barium, calcium or basic lead carbonate then gives the contracted ketone (XXIV). Catalytic reduction of the contracted ketone (XXIV) can be achieved by dispersing said compound in a lower alkyl alcohol ($C_1$–$C_4$) or an acetic acid solution and hydrogenating said solution in the presence of a palladium catalyst. This reduction gives the ketone (XXV) (melting point 147°–149° C.) which

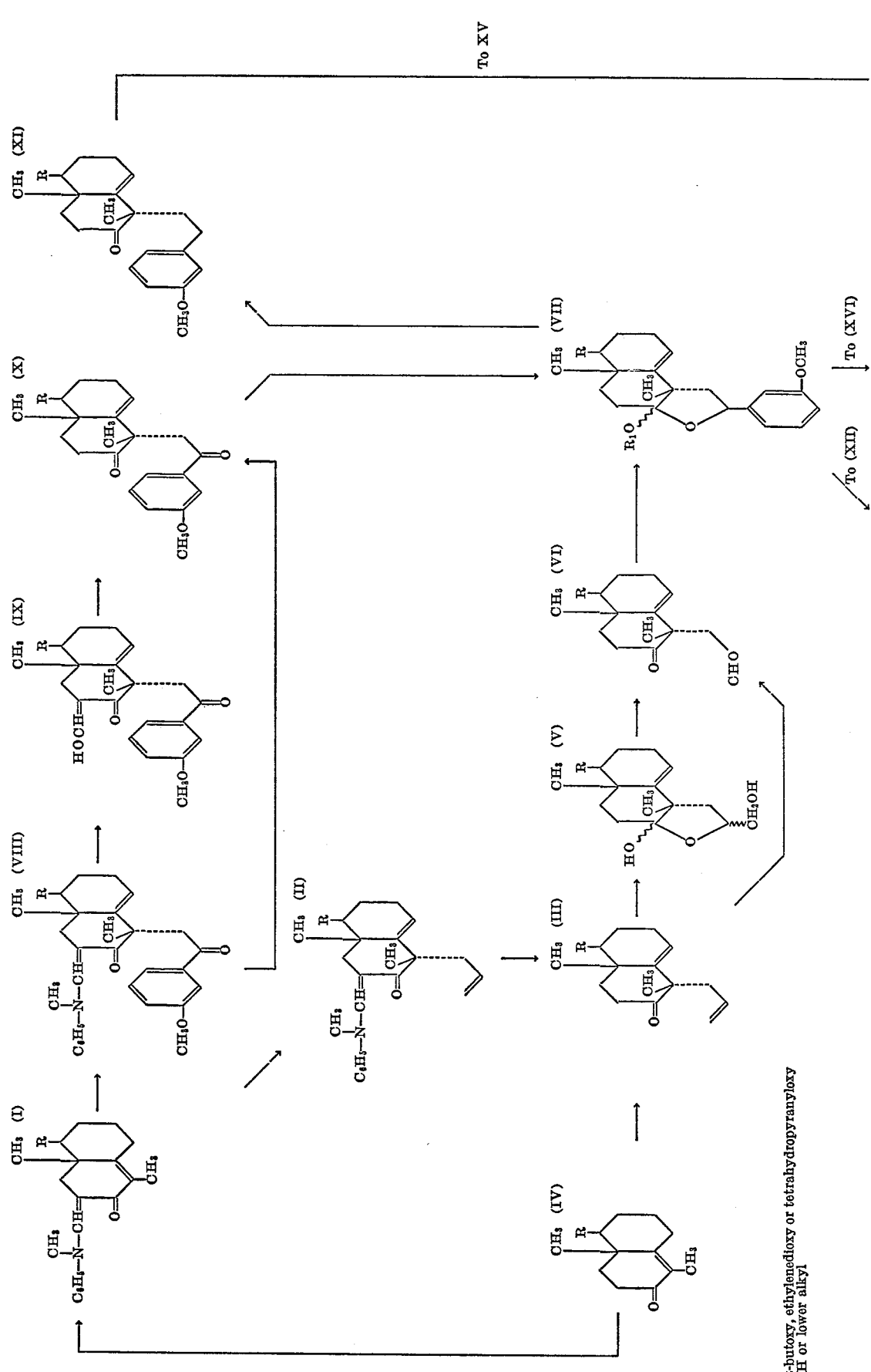

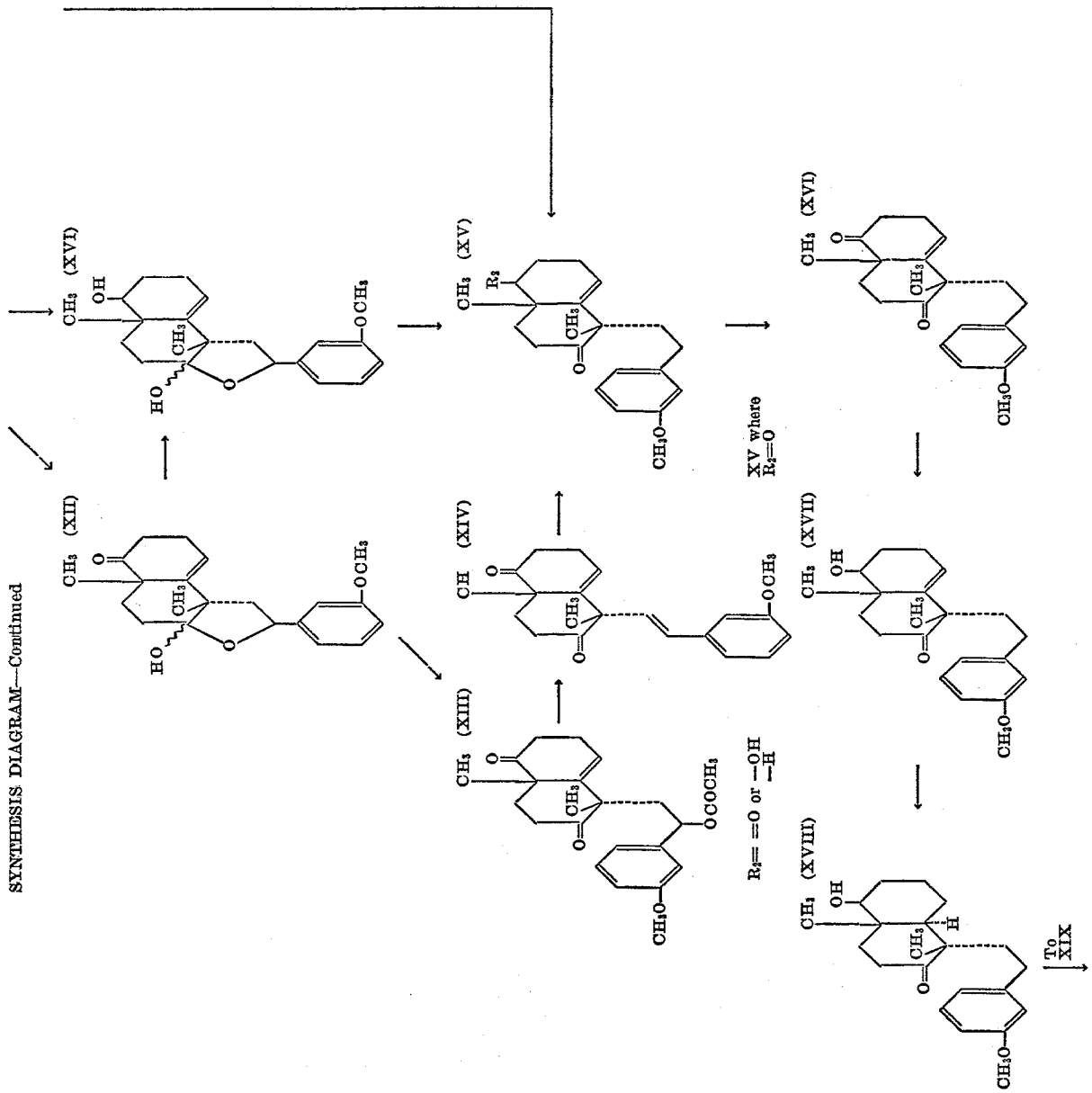

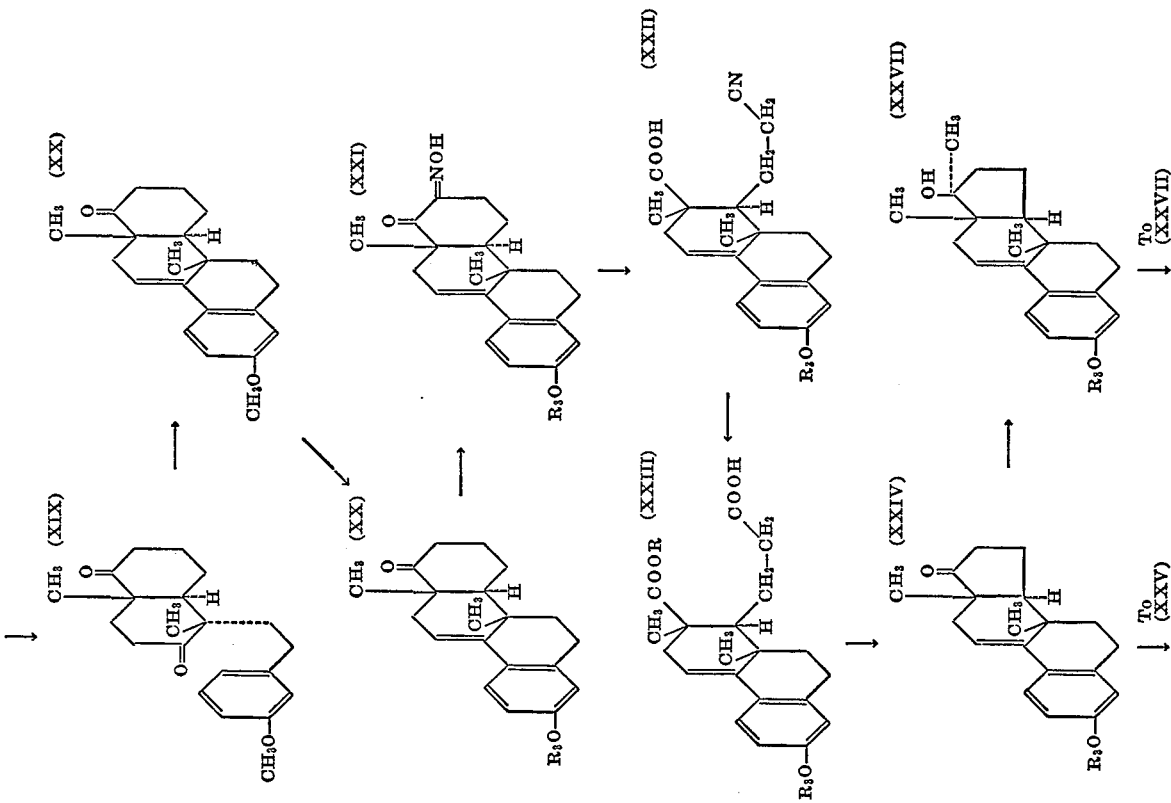

SYNTHESIS DIAGRAM—Continued

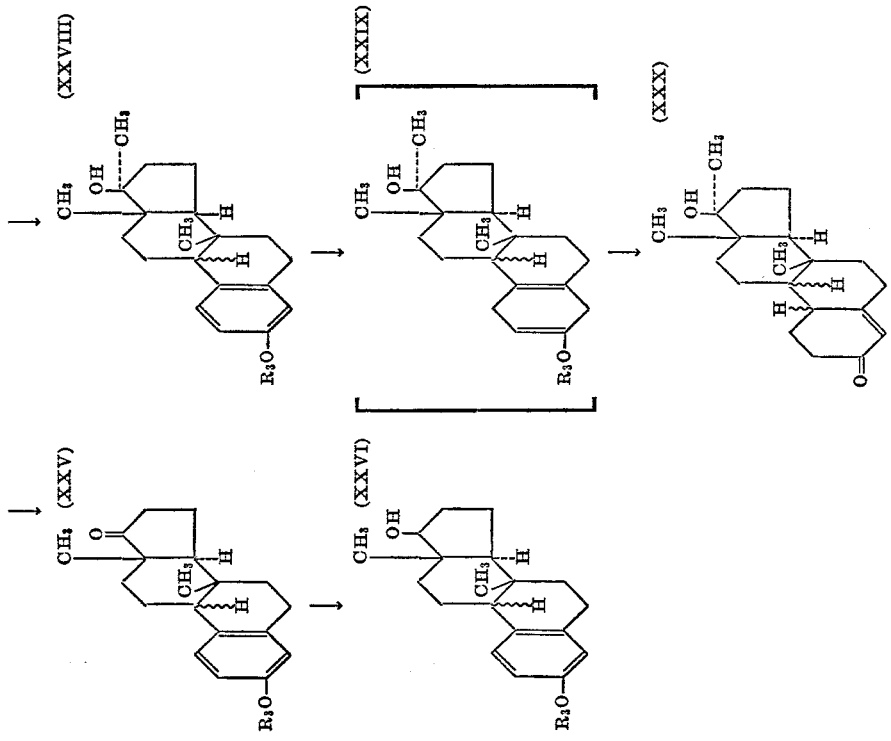

on further reduction with an alkali metal borohydride in the presence of a lower alkyl alcohol ($C_1$–$C_4$) or a lithium aluminum hydride gives the alcohol (XXVI) (melting point 126°–128° C.).

The reaction of the ring contracted ketone (XXIV) with methyl lithium or methyl magnesium halide in the presence of a dry ether such as dioxane, tetrahydrofuran or diethyl ether gives the styrene (XXVII) which can be reduced to the dihydro product by treatment with hydrogen in the presence of a palladium catalyst. The Birch reduction (i.e., reduction with alkali metal and liquid ammonia) of the dihydro product (XXVII) gives the dihydrobenzene (XXIX) which on acid hydrolysis gives the anabolic and androgenic product (XXX). The foregoing Synthesis Diagram, Cols. 5, 6, 7, 8, 9, 10, 11 and 12 illustrate the foregoing reactions.

As indicated above, the compounds of the present invention find utility as estrogenic, androgenic or antiovulatory agents in the treatment of laboratory or domestic animals.

Advantageously, these compounds are effective for their intended purpose when administered orally or parenterally. Orally they may be administered in admixture with the feed or in the form of a capsule, tablet, pill, emulsion, suspension solution or the like. They may be administered parenterally by dissolving the active ingredient, in a conventional pharmaceutically acceptable carrier and injecting the animal with the thus prepared solution. The intramuscular and subcutaneous routes of administration are generally preferred.

Usually about 0.25 mg./head/day to 10 mg./head/day of active ingredient is effective in obtaining the desired biological response in small animals. Somewhat higher doses may be desirable in larger animals such as cattle.

DETAILED DESCRIPTION

The following Examples 1 through 30 indicate the preparation of the starting materials and the remaining examples describe the preparation of the compounds claimed herein and the testing of said compounds as estrogenic, androgenic and antiovulatory agents.

EXAMPLE 1

Preparation of 4,4a,5,6,7,8-hexahydro-5β-hydroxy-1,4a, β-dimethyl-2(3H)naphthalenone (IV, R=hydroxyl)

A solution containing 58.4 (0.304 mole) endione (IV R=O) in 500 ml. absolute ethanol is cooled to 0° with stirring. Then 1.3 sodium borohydride is added to the solution and at 15 minute intervals, two more portions of 1.3 g. sodium borohydride is added. Fifteen minutes after the final addition, the solution is acidified with acetic acid and then the solvents evaporated. The residue is dissolved in chloroform, the organic phase washed with water, saturated sodium bicarbonate solution, dried and evaporated. The residue is distilled and recrystallized from ether-hexane and has melting point 79–80° C. Calcd. for $C_{12}H_{18}O_2$: C, 74.19; H, 9.34. Found: C, 74.17; H, 9.24.

EXAMPLE 2

Preparation of 5β-tert-butoxy-4,4a,5,6,7,8-hexahydro-1, 4aβ-dimethyl - 2(3H)naphthalenone (IV, R=tertiary-butoxy)

To a solution containing 4.0 g. (0.0206 mole) of the alcohol of Example 1 in 20 ml. dry methylene chloride at −20° C. in a pressure bottle is added approximately 20 ml. liquid isobutylene. Then 0.5 ml. catalyst (100% phosphoric acid saturated with boron trifluoride) is added, the pressure bottle closed and the mixture shaken at room temperature overnight. The bottle is cooled to −20° C. opened and a stream of dry nitrogen passed through the solution to remove excess isobutylene. The residue is diluted with methylene chloride and washed thoroughly with a saturated sodium bicarbonate solution. The aqueous phase is re-extracted with methylene chloride and the combined organic phase dried and evaporated. The products from a total of four such experiments were combined to give 24.1 g. oil. This is dissolved hexane and passed through a short column of neutral alumina. After evaporation of the solvent, the residue weighs 20.85 g. The t-butyl ether has boiling point 120–122° C. at 0.3 mm., $N_D^{25}$ 1.5073.

EXAMPLE 3

Preparation of 4,4a,5,6,7,8 - hexahydro - 1,4aβ - dimethyl-5β-[(tetrahydropyran - 2 - yl)-oxy]-2(3H)naphthalenone (IV, R=tetrahydropyranyloxy)

To a solution containing 1.94 g. (0.01 mole) of the alcohol (prepared in Example 1) in 10 ml. dry tetrahydrofuran is added 2.5 ml. of pure dihydropyran followed by 2 drops of phosphorus oxychloride. After standing at room temperature for 4 hours, the solution is poured into saturated sodium bicarbonate solution, extracted with ether and the ether extract dried and evaporated. The residue consists of essentially pure tetrahydropyranyl ether. The infrared spectrum shows no residual hydroxyl group. Other strong acid catalysts such as hydrochloric, sulfuric and p-toluene-sulfonic acid may replace the phosphorus oxychloride.

EXAMPLE 4

Preparation of 3',4',8',8'a-tetrahydro - 5',8'a - dimethyl-spiro[1,3-dioxolane - 2,1'(2H) - naphthalen]-6'(7'H)-one (IV, R=ethylenedioxy)

To a mixture of 6 g. (3.13 mmoles) enedione, (IV, R=O), 10 ml. ethylene glycol in 180 ml. benzene is added 100 mg. p-toluenesulfonic acid. The solution is heated at reflux under a water separator for 2¼ hours. The cold solution is diluted with ether and washed with sodium bicarbonate solution, water and saturated brine. The residue is filtered through a plug of alumina in benzene and the solvent evaporated. Crystallization of the residue from hexane at 0° gives 4.6 g. ketal (62.5%), melting point 53–55° C.

EXAMPLE 5

Preparation of 3',4',8',8a-tetrahydro-7'-(hydroxymethylene)5',8a - dimethyl-spiro[1,3 - dioxolane-2,1'-(2'H-naphthalen]-6'-(7'H)-one In a fixe liter 3-necked flask equipped with stirrer, dropping funnel and nitrogen inlet, there is placed 100 g. (1.85 moles) sodium methoxide, 1,700 ml. benzene and through the dropping funnel, 265 ml. ethyl formate. After cooling in an ice water bath, 127.4 g. (0.539 mole) ketal (prepared in Example 4) in 640 ml. benzene is added at 0° and stirred overnight at room temperature. The mixture is cooled to 0° and 500 ml. of 2.5 M sodium dihydrogen phosphate solution added. A further 500 ml. phosphate solution, 500 ml. water and 500 ml. benzene is added and the aqueous phase separated. The organic phase is washed with water, dried and evaporated. The residue weighs 143 g. and has the above structure.

EXAMPLE 6

Preparation of 5β-tert-butoxy-4,4a,5,6,7,8-hexahydro-3-(hydroxymethoxymethylene) - 1,4aβ - dimethyl-2(3H)-naphthalenone In a five liter 3-necked flask equipped with stirrer, dropping funnel with nitrogen inlet is placed 111 g. (2.06 mole) of sodium methoxide and 1,900 ml. dry benzene. A nitrogen atmosphere is maintained throughout the reaction. Through the dropping funnel is then added 300 ml. ethyl formate in a stream. The mixture is cooled to 12° C. and 150.5 g. (0.6 mole) of crude t-butyl ether (prepared in Example 2) in 700 ml. dry benzene is added dropwise and the mixture stirred overnight. The organic phase is then extracted with water and 2 N sodium hydroxide. The aqueous phases are acidified with 2.5 M sodium dihydrogen phosphate and extracted with ether. The ether extract is washed with water, dried and evaporated to give 164.2 g. of oil. The formyl compound is crystallized from n-propanol and has melting point 76–77° C. Calcd. for $C_{17}H_{26}O_3$: C, 73.34; H, 9.41. Found: C, 73.26; H, 9.42.

EXAMPLE 7

Preparation of 5β-tert-butoxy-4,4a,5,6,7,8-hexahydro-1, 4aβ-dimethyl - 3 - (N-methylanilinomethylene)-2(3H)-naphthalenone (I, R=t-butoxy)

To a solution containing 2.78 g. (10 mmoles) of the formyl compound (prepared in Example 6) in 10 ml. methanol is added 1.17 g. (11 mmoles) N-methylanilino. The mixture is warmed slightly and then allowed to stand at room temperature overnight. The solvent and excess anilino are removed under reduced pressure to leave 3.5 g. of orange-yellow oil. This material is crystallized from nitromethane and has melting point 77.5–79° C.

EXAMPLE 8

Preparation of 3',4',8',8'a-tetrahydro-5',8'a-dimethyl-7'-(N-methylanilinomethylene) - spiro[1,3 - dioxolane-2,1'(2'H)-naphthalen]-6'-(7'H)-one The formyl compound (prepared in Example 5) is dissolved in 900 ml. methanol and 296 ml. (293.2 g., 2.74 moles) of N-methylaniline added. After standing at room temperature, the crystalline product separates and is removed by filtration and washed with hexane. The solvents are removed under reduced pressure and finally high vacuum to remove excess N-methylaniline. The residue is triturated with 100 ml. methanol and the crystalline product removed by filtration. The combined crystalline product weighs 165.35 g., melting point 152–153° C.

EXAMPLE 9

Preparation of 5'α-allyl-3',7',8',8'a-tetrahydro-5'β,8'aβ-dimethyl - 7' - (N-methylanilinomethylene)-spiro[1,3-dioxolane-2,1'-(2'H) - naphthalen] - 6(4'H) - one (II, R=ethylenedioxy)

To a stirred solution of 3.53 g. (0.01 mole) of material (prepared in Example 8) in 125 ml. dry t-butanol under nitrogen is added 5.6 g. potassium t-butoxide. The solution is heated under reflux for 30 minutes. The mixture is cooled to room temperature and 6.05 g. (0.05 mole) redistilled allyl bromide added dropwise. The solution is then heated under reflux for 1 hour. After cooling, the solution is poured into water, acidified with 2.5 M sodium dihydrogen phosphate and extracted with ether. The extract is washed with water, dried and the solvent removed under reduced pressure to give the crude product (4.35 g.). Crystallization from absolute ethanol gives 2.24 g. (57%) of desired product, melting point 147.5–149.5° C. Calcd. for $C_{25}H_{31}O_3N$: C, 76.30; H, 7.94; N, 3.56. Found: C, 75.98; H, 7.81; N, 3.83.

EXAMPLE 10

Preparation of 5'α-allyl-3',7',8',8'a-tetrahydro-5'b,8'aβ-dimethyl - yl - spiro[1,3-dioxolane-2,1'(2'H)-naphthalen]-6'(5'H)-one (III, R=ethylenedioxy)

A mixture containing 30.65 g. (0.078 mole) aniline compound, (prepared in Example 9) in 160 ml. 2-ethoxyethanol and 160 ml. water containing 35.0 g. potassium hydroxide is heated at reflux under nitrogen for 4 hours. The mixture is cooled, diluted with water and extracted with ether. The organic phase is washed successively with water, dilute hydrochloric acid, water and brine, dried and evaporated. The residue is crystallized from hexane to give the product melting point 67.5–68.5° C. Calcd. for $C_{17}H_{24}O_3$: C, 73.88; H, 8.75. Found: C, 73.73; H, 8.64.

EXAMPLE 11

Preparation of 5'α-allyl-3',7',8',8'a-tetrahydro-5'β,8'aβ-dimethyl - spiro[1,3-dioxolane-2,1'(2'H)-naphthalen]-6'(5'H)-one (III, R=ethylenedioxy)

To a solution containing 47.0 g. enone (prepared in Example 4) in 500 ml. dry t-butanol is added under nitrogen with stirring 56 g. potassium t-butoxide. The mixture is heated under reflux for 2 hours. The solution is cooled to room temperature and 29 g. allyl bromide is added dropwise. After stirring a further ½ hour at room temperature, the mixture is poured into water and extracted twice with ether. The ether extract is washed twice with water, dried and evaporated. The residue is crystallized from hexane to give 30.9 g. allyl compound identical with that formed in Example 10.

When the starting material contains the t-butoxy or tetrahydropyranyloxy group instead of ethylenedioxy, the corresponding t-butoxy and tetrahydropyranyloxy products are obtained.

EXAMPLE 12

Preparation of 2',3'a,4',5',5'a,7',8',9'b-octahydro-3'a-hydroxy - 5'aβ,9'bβ - dimethyl-spiro[1,3-dioxolane-2,6'(1'H) - naphtho[2,1 - b] - furan] - 2' - methanol (V, R=ethylenedioxy)

To a solution containing 27.6 g. of the allyl compound (prepared in Example 10), in 450 ml tetrahydrofuran is added a solution containing 12.8 g. sodium chlorate in 200 ml. water and 2 ml. of an aqueous solution of osmium tetroxide (1 mmole/5 ml. water). After standing overnight at room temperature, this solution is combined with a similar one and shaken with a solution of 575 g. sodium sulfite in 2.5 liters of water. The mixture is extracted twice with methylene chloride and the extract washed with saturated brine. The organic phase is dried and concentrated. The residue is crystallized from ether to give 49.9 g. hemiketal, melting point 122–136° C. as a mixture of stereoisomers. A second crop of crystals weighed 4.4 g.

Similar reaction with either the tetrahydropyranyl ether or t-butyl ether yield the corresponding hemiketal as oils.

EXAMPLE 13

Preparation of 5',α-formylmethyl-3',7',8',8'a-tetrahydro-5'β,8'aβ - dimethyl - spiro[1,3 - dioxolane-2,1'-(2'H)-naphthalen]-6'-(5'H)-one (VI, R=ethylenedioxy)

To a solution containing 49.9 g. of the hemiketal (prepared in Example 12), in 480 ml. tetrahydrofuran is added with stirring and cooling 74.1 g. sodium metaperiodate in 480 ml. water. Stirring is continued overnight at room temperature. The mixture is then shaken with a solution containing 230 g. sodium sulfite and extracted with methylene chloride. The extract is washed with saturated brine, dried and evaporated. The residue is crystallized from ether-hexane to give 38.2 g. of the above aldehyde, melting point 61–62.5° C. identical with the aldehyde by ozonolysis of (III).

EXAMPLE 14

Preparation of 5'α - formylmethyl-3',7',8',8'a-tetrahydro-5'β,8'aβ - dimethylspiro[1,3-dioxolane-2,1'-(2'H)-naphthalen]-6'(5'H)-one (VI, R=ethylenedioxy)

In a gas wash bottle with fritted disc on the end of the inlet tube is placed 2.76 g. (0.01 mole) of allyl compound (prepared in Example 11) and 5.2 ml. pyridine and 36 ml. chloroform added. The solution is cooled to −20° C. and 1.3 equivalents of ozone passed into the solution. Excess ozone is then removed in a stream of nitrogen. Then a mixture of 5.48 ml. water, 5.45 ml. acetic acid and 10.76 ml. pyridine is added to the solution. While keeping the temperature of the solution below 0°, 3.28 g. zinc powder (which had been washed first with 2 N acetic acid followed by water) is added in small portions with shaking and cooling during about 20 minutes. The mixture is filtered into a separatory funnel and diluted with benzene and water. The aqueous phase is reextracted with benzene. The combined organic phases are washed successively with water, saturated sodium bicarbonate, with 1.5 N phosphoric acid, saturated sodium bicarbonate and water. The benzene solution is dried and evaporated to leave the above aldehyde (2.0 g.).

EXAMPLE 15

Preparation of 2',3'a,4',5',5'a,7',8',9'b - octahydro-2'-(m-methoxyphenyl) - 5'aβ,9'bβ - dimethyl-spiro[1,3-dioxolane-2,6'-(1'H)naphtho[2,1-b]furan]-3'a-ol (VII, R=ethylenedioxy and $R_1$=H)

All operations are carried out under dry nitrogen. To 1 g. of magnesium is added enough dry tetrahydrofuran to cover the metal. A few drops of dibromoethane is added to initiate the reaction. Then 5.61 g. (0.03 mole) m-bromoanisole is added at such a rate as to maintain a reaction mixture temperature of about 50°. The mixture was then stirred at 50° for a further 0.5 hour. The Grignard reagent is transferred to a dropping funnel using dry tetrahydrofuran to complete the transfer. Half of this solution is then added dropwise to the crude aldehyde (prepared in Example 14) in 40 ml. dry tetrahydrofuran. After the addition, the reaction mixture is stirred at room temperature for 1 hour. The excess reagent is destroyed by the addition of 40 ml. of a 2.5 M sodium dihydrogen phosphate and after stirring for 10 minutes, the mixture is diluted with ether and water. The ether extract is washed twice with water followed by saturated brine, dried and evaporated. The residue is crystallized from ether to give in three crops 1.2 g. of the above hemiketal, melting point 148–155° C.

EXAMPLE 16

Preparation of 3',7',8'-,8'a - tetrahydro-5'α-(m-methoxyphenacyl) - 5'β,8'aβ - dimethyl - 7'-(N-methylanilinomethylene) - spiro[1,3 - dioxolane-2,1'(2'H)-naphthalen]-6'(5'H)-one (VIII, R=ethylenedioxy)

In a flask equipped with stirrer, condensor (with dry nitrogen inlet) and dropping funnel are placed 52.95 g. (0.15 mole) of 3',4',8',8a' - tetrahydro-5',8'a-dimethyl-7'-(N - methylanilinomethylene) - spiro[1,3-dioxolane-2,1' (2'$\underline{H}$)naphthalen]-6'(7'$\underline{H}$)-one (prepared in Example 8) in 600 ml. dry dimethoxyethane and 16.65 g. sodium hydride (54% suspension in mineral oil). The mixture is heated with stirring under reflux in a nitrogen atmosphere for two hours. This mixture is cooled and a solution of 51.45 g. (0.225 mole) of m-methoxyphenacyl bromide in about 500 ml. dry dimethoxyethane is added very slowly at room temperature. After the addition, the solution is stirred overnight at room temperature. Water is added to the solution and the reaction mixture poured into water, acidified with 2.5 M sodium dihydrogen phosphate and extracted with methylene chloride. The extract is washed with water, dried and evaporated. The residue is crystallized from acetone to give 45.3 g. (60%) of desired product, melting point 169.5–170.5° C. Calcd. for $C_{31}H_{35}O_5N$: C, 74.23; H, 7.03; N, 2.79. Found: C, 74.39; H, 7.20; N, 2.36.

A similar experiment is run using the same quantities as above. The only modification made is that the phenacyl bromide is added to the reaction mixture at ice-bath temperature during 4.2 hours. The yield of product is 63.9 g. or 84.7%.

EXAMPLES 17 AND 18

Preparation of 3',7',8',8'a-tetrahydro-5'-α-(methoxyphenacyl) - 5'β, - 8'aβ - dimethyl-spiro[1,3-dioxolane-2,1' (2'H) - naphthalen]-6'(5'H) - one (X, R=ethylenedioxy), and 3',7',8',8'a - tetrahydro - 7'-(hydroxymethylene) - 5'α - (m - methoxyphenacyl)-5'β,8'aβ-dimethyl, spiro[1,3 - dioxolane - 2,1'(2'H)-naphthalen]-6'(5'H)-one (IX, R=ethylenedioxy)

To a solution of 9.18 g. (0.183 mole) of the anilino compound (prepared in Example 16) in 610 ml. 2-ethoxyethanol is added 610 ml. water containing 258 g. potassium hydroxide. The mixture is heated at reflux under nitrogen for 6 hours and then cooled overnight. Two liters of water are added and the solution extracted with ether. The ether extract is successively washed with water, cold 2 N hydrochloric acid and water. The extract is dried and the solvent evaporated. The residue (X, R=ethylenedioxy) on trituration with ether and recrystallization from acetone-hexane as melting point 121–122° C. Calcd. for $C_{23}H_{28}O_5$: C, 71.85; H, 7.34. Found: C, 71.59; H, 7.34.

The aqueous phase from the first ether extraction above is acidified with ice-cold 2 N hydrochloric acid and extracted with methylene chloride. The extract is washed with water and brine, dried and evaporated. The residue on trituration with ether at −5° C. and recrystallization from methanol gave the formyl compound, melting point 157–160.5° C. (IX, R=ethylenedioxy). Calcd. for $C_{24}H_{28}O_6$: C, 69.88; H, 6.84. Found: C, 69.57; H, 6.89.

EXAMPLE 19

Preparation of 3',7',8',8'a - tetrahydro-5'α-(m-methoxyphenethyl) - 5'β,8'aβ-dimethyl-spiro[1,3-dioxolane-2,1' (2'H) - naphthalen]-6'(5'H)-one (XI, R=ethylenedioxy)

(A) A solution containing 10.0 g. (0.026 mole) of the diketone (X, R=ethylenedioxy) (Example 17) in 150 ml. glacial acetic acid is reduced with hydrogen at 70° C. in the presence of 1 g. 5% palladium-on-carbon. The initial pressure is 51.8 p.s.i. Reduction is complete in 3 hours. The solution is cooled, the catalyst removed by filtration and the solvent removed under reduced pressure. The residue (i.e., crude product [XI, R=ethylenedioxy]) is used directly for the preparation of the naphthalenedione (XV, $R_2$=O, R=ethylenedioxy).

(B) A solution containing 4.5 g. of hemiketal (prepared in Example 15) in 50 ml. glacial acetic acid is reduced with hydrogen at 70° and 50 p.s.i. in the presence of 200 mg. 5% palladium-on-carbon. Reduction is complete in 3 hours. The catalyst is removed and the solvent evaporated to leave crude ketone (XI, R=ethylenedioxy) of sufficient purity for further transformations.

(C) Similarly, reduction of the corresponding t-butoxy or tetrahydropyranyloxy ethers (VII) yields the corresponding ketones (XI, R=t-butoxy and tetrahydropyranyloxy).

EXAMPLE 20

Preparation of 2',3'a,4',5',5'a,7',8',8'b-octahydro - 2 - (m-methoxyphenyl) - 5'aβ,9'bβ - dimethyl - spiro[1,3-dioxolane-2,6'(1'11)-naphtho[2,1-b]furan] - 3'a - ol (VII, R'=H) 2',3'a,4',5',5'a,7,8',9'b - octahydro - 3'aξ - methoxy - 2' - (m-methoxyphenyl) - 5'aβ,9'bβ - dimethyl-spiro-3a,4,5,5a,8,9b-octahydro - 3aξ - hydroxy-2-(m-methoxyphenyl)-5aβ,9bβ - dimethyl-naphtho[2,1-b]furan-6(7H)-one (XII)

A solution containing 10 g. of the diketone (prepared in Example 17) (X, R=ethylenedioxy) in 180 ml. methanol is reduced catalytically at 60° C. and an initial pressure of 50 p.s.i. in the presence of 1.0 g. 5% palladium-on-carbon. The reduction is complete in 2 hours. The mixture is cooled, and filtered and the solvent removed under reduced pressure. The residue is a mixture of hemiketal (VII, $R_1$=H) and the mixed ketal (VII, $R_1$=CH$_3$).

The crude reduction product is dissolved in a mixture of 108 ml. acetic acid and 36 ml. water and the solution heated on the steam bath for 1 hour. The reaction mixture is poured into water and extracted with ether. The extract is washed with water and saturated sodium bicarbonate solution. The ether is dried, the solvent evaporated and the residue crystallized from acetone-hexane to give product (XII), melting point 135.5–138.5° C. Calcd. for $C_{21}H_{26}O_4$: C, 73.66, H, 7.66. Found: C, 73.60, H, 7.59.

By concentration of the mother liquors the second crystalline isomer, is obtained. Recrystallization of this material from acetone-hexane gives product, melting point 132.5–133.5° C.

EXAMPLE 21

Preparation of 3,7,8,8a-tetrahydro-5α-(β-hydroxy-m-methoxyphenethyl)-5β,8aβ-dimethyl-, 1,6(2H,5H) - naphthalenedione, acetate (XIII)

A solution containing 5.0 g. (0.0146 mole) of the hemiketal (XII) (prepared in Example 20) in 80 ml. acetic acid and 40 ml. acetic anhydride is heated under reflux for 1 hour. The solvents are then removed under reduced pressure, the residue dissolved in toluene and this also removed under reduced pressure. The residue compound (XIII) is used without further purification.

EXAMPLE 22

Preparation of 3,7,8,8a-tetrahydro-5α-(m-methoxystyryl)-5β,8aβ - dimethyl-1,6(2H,5H)-naphthalenedione (XIV)

A solution containing 2.0 g. p-toluenesulfonic acid in 170 ml. benzene is heated under reflux under a Dean-Stark water separator filled with anhydrous calcium sulfate for 20 minutes. The crude acetate prepared in Example 21 in 40 ml. benzene is then added and refluxing continued for 1 hour. The solution is cooled, diluted with ether and washed with saturated sodium bicarbonate. The organic phase is dried and evaporated. The residue is crystallized from methanol to give 1.8 g. product (XIV). Recrystallization of this material from methanol gives 1.5 g., melting point 91–92° C. Calcd. for $C_{21}H_{24}O_3$: C, 77.75; H, 7.46. Found: C, 77.57; H, 7.51.

EXAMPLE 23

Preparation of 3,7,8,8a-tetrahydro-5α-(m - methoxyphenyl) - 5β,8aβ - dimethyl - 1,6(2H,5H)-naphthalenedione (XV, $R_2$=O)

The crude product (XI) prepared in Example 19 above is heated on the steam-bath with 20 ml. water and enough acetic acid to give a homogeneous solution for 1 hour. After standing at room temperature overnight, the solution is diluted with water and extracted with ether. The ether extract is washed with water and then saturated sodium bicarbonate solution. The extract is dried and the solvent removed. The residue crystallized from methanol to give 5.0 g. product (XV, $R_2$=O), melting point 68–70° C.

EXAMPLE 24

Preparation of 3,7,8,8a-tetrahydro-5α-(m - methoxyphenyl) - 5β,8aβ - dimethyl - 1,6(2H,5H)-naphthalenedione (XV, $R_2$=O)

A solution containing 324 mg. (1 mmole) of compound (XIV) (prepared in Example 22) in 15 ml. ethanol is reduced catalytically at room temperature and atmospheric pressure in the presence of 50 mg. 5% palladium-on-carbon. The catalyst is removed by filtration and the solvent removed under reduced pressure. After standing for some time, the product crystallizes. Crystallization from a mixture of ether and hexane gives product, (XV, $R_2$=O), melting point 69–71° C. Calcd. for $C_{21}H_{26}O_3$: C, 77.27; H, 8.03. Found: C, 77.39; H, 7.93.

EXAMPLE 25

Preparation of 1,2,3a,4,5,5a,6,7,8,9b-decahydro-2-(methoxyphenyl) - 5aβ,9bβ - dimethyl, naphtho [2,1-b]furan-3aξ,6β-diol (XVI)

To a solution containing 5.0 g. (0.015 mole) ketone (XII) (prepared in Example 20) in 100 ml. absolute ethanol is added 2.0 g. sodium borohydride. The reaction is allowed to proceed to room temperature with intermittent swirling for 15 minutes. The mixture is then poured into water and extracted with ether. The ether extract is washed with water, saturated brine, dried and evaporated. The residue is crystallized from acetone-hexane to give product compound (XVI), melting point 141–148° C. Calcd. for $C_{21}H_{28}O_4$: C, 73.22; H, 8.19. Found: C, 73.05; H, 8.13.

EXAMPLE 26

Preparation of 3,4,4a,5,6,7-hexahydro-5β-hydroxy-1α-(methoxyphenyl)-1β,4aβ - dimethyl - 2(1H)-naphthalenone (XVII)

A solution containing 688 mgs. of the hemiketal (prepared in Example 25) in 18 ml. glacial acetic acid is reduced with hydrogen at 45 p.s.i. and 70° in the presence of 100 mgs. 5% palladium-on-carbon. The reduction is complete in 2 hours when the mixture is cooled, the catalyst removed and the solvent evaporated under reduced pressure. The material (XV, $R_2$=OH or XVII) is of sufficient purity for conversion by oxidation to compound (XV, $R_2$=O) or reduction to compound (XVIII).

EXAMPLE 27

Preparation of 3,4,4a,5,6,7-hexahydro-5β-hydroxy-1α-(m - methoxyphenethyl) - 1β,4aβ - dimethyl-2(1H)-naphthalenone (XVII)

(A) To a solution containing 1.63 g. of the enedione (prepared in Example 23) in 25 ml. 95% ethanol is added with stirring 0.5 g. sodium borohydride. Stirring is continued for 15 minutes and the mixture then diluted with a large volume of water. The solution is extracted with ether, the extract washed with water, dried and evaporated. The residue compound (XVII), an oil, is used without further purification.

(B) A solution containing 688 mgs. of the hemiketal (prepared in Example 25) in 18 ml. acetic acid is hydrogenated at 70° C. and 50 p.s.i. After three hours the catalyst is removed and the solvent evaporated to give a residue identical to that described above compound (XVII).

EXAMPLE 28

Preparation of 3,4,4a,5,6,7,8,8aα-octahydro-5β-hydroxy-1α(m-methoxyphenethyl) - 1β,4aβ - dimethyl - 2(1H)-naphthalenone (XVIII)

A solution containing 1.38 g. of crude unsaturated keto alcohol (XVII) prepared as in Example 27 in 20 ml. ethanol is reduced at 70° C. with hydrogen in the presence of 200 mg. 5% palladium-on-carbon. After 20 hours, the catalyst is removed and the solvent evaporated. The residue containing the above named product (XVIII) is used without further purification.

EXAMPLE 29

Preparation of 3,4,4aα,7,8,8a-hexahydro-5α-(m-methoxyphenethyl)-5β,8aβ - dimethyl-1,6(2H,5H)-naphthalenedione (XIX)

The crude keto alcohol (XVIII) prepared in Example 28 is dissolved in 20 ml. acetone and cooled to 0°. Jones' reagent is then added dropwise with stirring until a permanent brown color is obtained. The solution is stirred for 15 minutes at room temperature and then poured into water and extracted with ether. The extract is washed with water, dried and evaporated. The residue is crystallized from ether-hexane to give 640 mg. trans-dione, (XIX), melting point 86–88.5° C.

EXAMPLE 30

Preparation of 3-methoxy-8β-methyl-D-homoestra-1,3, 5(10),9(11)-tetraen-17a-one (XX)

To 328 mgs. of the trans-dione (XIX) (prepared in Example 29) in 6 ml. ethanol is added 3 ml. concentrated hydrochloric acid and the solution refluxed for 20 minutes. The mixture is diluted with water and extracted with water, dried and evaporated. The residue is crystallized from acetonitrile to give the product (XX), melting point 150.5–152.5° C.

EXAMPLE 31

Preparation of 3 - methoxy-8β-methyl-D-homoestra-1,3, 5(10),9(11) - tetraene-17,17a-dione, 17-oxime (XXI, $R_3$=CH$_3$)

To a stirred solution containing 16.8 g. (54.2 mmoles) of the ketone (Example 30) in 2 pints t-butanol under nitrogen is added 12.1 g. potassium t-butoxide. The mixture is stirred for 1 hour at 37° C. A solution of 13.6 g. butyl nitrite in 50 ml. t-butanol is then added during 2 hours. The solution is stirred overnight at room temperature and then diluted with water and acidified with dilute hydrochloric acid. The aqueous solution is extracted thoroughly with methylene chloride and the organic phase washed thoroughly with water. After drying, the solvents are removed and the residue triturated with ether. The solid is removed by filtration and recrystallized from acetic acid to yield product, melting point 204° C.

*Analysis.*—Calcd. for $C_{21}H_{25}NO_3$ (percent): C, 74.31; H, 7.42; N, 4.13. Found (percent): C, 74.47; H, 7.18; N, 3.76.

EXAMPLE 32

Preparation of 2α - carboxy-1α,2,3,9,10,10a-hexahydrohydro - 7 - methoxy-2α,10aα-dimethyl-2β-phenanthrenecarboxylic acid (XXII, $R_3$=CH$_3$)

In a 1 liter 3-necked flask equipped with stirrer, nitrogen inlet and dropping funnel is placed 13.93 g. (41 mmoles) of the oximino-ketone, (Example 31) 195 ml. dioxane, 125 ml. water and 129 ml. 3 N sodium hydroxide. The mixture is warmed to obtain a homogeneous solution. The solution is cooled to 37° C. and 26 g. of p-toluenesulfonyl chloride in 100 ml. dioxane added during 2 hours. The mixture is then warmed to 65° C. and stirring continued at this temperature for 2 hours. The cooled solution is diluted with 100 ml. 1 N potassium hydroxide solution and extracted with ether. The ether extract is washed with 4 N potassium hydroxide solution and the basic solutions are combined, acidified with concentrated hydrochloric acid, and extracted twice with ether. The extract is washed with water, dried and evaporated. Trituration of the residue with methanol followed by recrystallization from nitromethane and then methylene chloride gives product, melting point 184–185° C.

*Analysis.*—Calcd. for $C_{21}H_{25}NO_3$ (percent): C, 74.31; H, 7.42; N, 4.15. Found (percent): C, 74.38; H, 7.57; N, 4.01.

EXAMPLE 33

Preparation of 2α - carboxy - 1α,2,3,9,10,10a-hexahydro-7 - methoxy - 2β,10aβ-dimethyl-1β-phenanthrenepropionic acid (XXIII, $R_3=CH_3$)

A suspension of 11.2 g. (33 mmoles) of the cyano acid (Example 32) in 300 ml. 12.5% sodium hydroxide is heated under reflux for 6 hours. Most of the solid is in solution after 3 hours. The cold solution is acidified with concentrated hydrochloric acid and the precipitate filtered and dried. The di-acid recrystallized from methanol has, melting point 201–202° C.

*Analysis.*—Calcd. for $C_{21}H_{26}O_5$ (percent): C, 70.37; H, 7.31. Found (percent): C, 70.34; H, 7.23.

EXAMPLE 34

Preparation of 3-methoxy-8β-methyl-estra-1,3,5(10), 9(11)-tetraen-17-one (XXIV, $R_3=CH_3$)

A mixture of the diacid (5.0 g.) (Example 33) and basic lead carbonate (7.0 g.) are ground together and placed in a glass tube. The tube is heated at 310° C.–320° C. at 0.1 mm. pressure for about 1 hour, when the product distilled from the heated zone and crystallized on the cool part of the tube. The products from three such experiments are combined and crystallized from acetone-hexane to give 10.45 g. (84%) of the above ketone, melting point 125–127.5° C.

*Analysis.*—Calcd. for $C_{20}H_{24}O_2$ (percent): C, 81.04; H, 8.16. Found (percent): C, 81.32; H, 7.97.

EXAMPLE 35

Preparation of 3-methoxy-8β-17α-dimethyl-estra-1,3, 5(10),9(11)-tetraen-17β-ol (XXVII, $R_3=CH_3$)

To a stirred solution containing 1.184 g. ketone (4 mmoles) (Example 34) in 160 ml. dry ether under nitrogen is added dropwise 14 ml. of a 1.6 M solution of methyl lithium in ether. After stirring at room temperature for 3.5 hours, 40 ml. absolute ethanol is added dropwise. The solution is diluted with water, the ether separated and washed twice with water, dried and evaporated. The residue is chromatographed on neutral alumina and seven fractions (two using benzene, two with 1:1 benzene:ether, one with ether and two with chloroform) collected. Fractions 4–7 are combined and crystallized from acetone-hexane yielding product, melting point 128–130.5° C.

*Analysis.*—Calcd. for $C_{21}H_{28}O_2$ (percent): C, 80.73; H, 9.03. Found (percent): C, 80.50; H, 9.11.

EXAMPLE 36

Preparation of 3-methoxy-8β-methyl-9-ξ-estra-1,3,5(10)-trien-17-one (XXV, $R_3=CH_3$)

To a solution containing 296 mg. (1 mmole) unsaturated compound (Example 34) in 25 ml. acetic acid is added 50 mg. 5% palladium-on-carbon and the mixture reduced with hydrogen at room temperature and atmospheric pressure. One equivalent of hydrogen is absorbed in 1 hour. The catalyst is removed and the solvent evaporated. The residue in benzene is passed through a plug of activated magnesium silicate and after evaporation of the benzene, the residue crystallized from acetone-hexane to give 245 mg. saturated product, melting point 147–149° C.

*Analysis.*—Calcd. for $C_{20}H_{26}O_2$ (percent): C, 80.49; H, 8.78. Found (percent): C, 80.19; H, 8.60.

EXAMPLE 37

Preparation of 3-methoxy-8β-methyl-9-ξ-estra-1,3,5(10)-trien-17β-ol (XXVI, $R_3=CH_3$)

To a solution containing 1.2 g. (4 mmoles) ketone (Example 36) in 50 ml. 95% ethanol is added 1.0 g. sodium borohydride. After standing for 2 hours at room temperature, 0.5 g. sodium borohydride is added and again left at room temperature for 2½ hours. Water is added and the solution acidified with concentrated hydrochloric acid. The product is extracted into ether, the ether washed twice with water, saturated sodium bicarbonate, dried, evaporated and recrystallized from acetone-hexane to give product, melting point 126–128° C.

Calcd. for $C_{20}H_{28}O_2$ (percent): C, 79.95; H, 9.39. Found (percent): C, 80.20; H, 9.10.

EXAMPLE 38

Preparation of 3-methoxy-8β,17α-dimethyl-9-ξ-estra-1,3, 5(10)-trien-17β-ol (XXVIII, $R_3=CH_3$)

A solution containing 2.0 g. (6.4 mmoles) of the methyltetraen (Example 35) in 50 ml. acetic acid is reduced with hydrogen at room temperature and atmospheric pressure in the presence of 200 mg. 5% palladium-on-carbon. Reduction is complete in 2 hours. The catalyst is removed by filtration and the solvent removed under reduced pressure. The residue in benzene is filtered through a plug of activated magnesium silicate and the product crystallized from acetone-hexane then recrystallized twice from acetonitrile to give the compound, melting point 115–116° C.

*Analysis.*—Calcd. for $C_{21}H_{30}O_2$ (percent): C, 80.21; H, 9.62. Found (percent): C, 80.03; H, 9.95.

EXAMPLE 39

Preparation of 17β-hydroxy-8β,17α-dimethyl-9-ξ,10-ξ-estr-4-en-3-one (XXX)

In a 1 liter 3-necked flask equipped with stirrer, Dry-Ice condenser and dropping funnel is placed 3.0 g. starting material (Example 38) in 530 ml. dry ether. Then 670 ml. anhydrous ammonia is distilled directly into the flask followed by the addition of 6.0 g. lithium wire in small pieces. After stirring for 0.5 hour approximately 100 ml. absolute ethanol is added dropwise to discharge the blue color. The ammonia is allowed to evaporate and more ether added followed cautiously by water dropwise. The organic phase is separated, washed thoroughly with water, dried and evaporated. The residue is crystallized from acetone-hexane to give 1.85 g. of the dihydrobenzene (XXIX, $R_3=CH_3$), melting point 148–150.5° C.

A solution containing 1.75 g. of the above dihydrobenzene in 50 ml. methanol and 12 ml. 2 N hydrochloric acid is refluxed for 0.5 hour. The solution is cooled, poured into water and extracted with ether. The extract is washed with water, dried and evaporated. The residue is crystallized from acetone-hexane to yield the product, melting point 168–169° C.

Calcd. for $C_2H_3O_2$ (percent): C, 79.42; H, 10.00. Found (percent): C, 79.42; H, 9.81.

EXAMPLE 10

Test for estrogenic activity

Immature female Wistar origin rats are 19 to 21 days of age and are employed as the test animal to determine estrogenic activity of candidate compounds. Test compounds are given by subcutaneous injections once daily for three successive days in 0.2 ml. of injection vehicle.

This injection vehicle is:

Carboxymethylcellulose (low viscosity) _____gm__ 0.5
Tween 80 _____gm__ 0.4
Sodium chloride _____gm__ 0.9
Polyethylene glycol (Carbowax 300) _____ml__ 10.0
Distilled water _____ml__ 90.0

Twenty-four hours after the third injection the rats are sacrificed, the uteri removed and disected free from the ovaries, oviducts and mesentery. Each uterine horn is split longitudinally and the uterine fluid bottled dry. The uteri are weighed to the nearest milligram on a balance. Ten rats are used for each treatment. Increased uterine weight over the control (untreated) uteri indicates estrogenic activity All animals receive a commercial laboratory animal ration ad libitum and fresh water is available at all times while on test. The following Table I summarizes the estrogenic activity of the present compounds.

TABLE I

| Compound | Effective dose mg./rat/day |
|---|---|
| [structure] | 0.5 |
| [structure] | 0.5 |
| [structure] | 0.5 |
| [structure] | 0.5 |
| [structure] | 0.5 |

TABLE I—Continued

| Compound | Effective dose mg./rat/day |
|---|---|
| [structure] | 0.5 |
| [structure] | 0.5 |

EXAMPLE 41

Antiovulatory test

Adult female rats of Wistar origin weighing approximately 170 to 180 grams each are used as the test animal. Starting on the day of vaginal estrus, test compounds are given by subcutaneous injections once daily for five successive days in 1 ml. of injection vehicle. The injection vehicle is:

Carboxymethylcellulose (low viscosity) _____gm__ 0.5
Tween 80 _____gm__ 0.4
Sodium chloride _____gm__ 0.9
Polyethylene glycol (Carbowax 300) _____ml__ 10.0
Distilled water _____ml__ 90.0

Twenty-four hours after the last injection of test compound the rats are sacrificed and the uteri, oviducts and ovaries are removed. The oviducts and a small segment of the uterine horn are separated from the remainder of the uterine horn and ovaries. These oviducts are then flushed with physiological saline to determine if ova are present. A compound is considered to be antiovulatory if none of 6 treated female rats ovulate (have ova in the oviducts). All animals received a commercial laboratory animal ration ad libitum and fresh water is available at all times while on test. The following Table II summarizes antiovulatory testing data.

TABLE II

| Compound | Effective dose, mg./rat/day |
|---|---|
| [structure] | 2 |

EXAMPLE 42

Androgen-anabolic assay

This test is based on increases in ventral prostate and seminal vessicle weights as a measure of androgenic activity and an increase in levator and muscle weight as a measure of anabolic activity. The test uses male rats castrated at 21 days of age and placed on test the following day (5 rats per treatment). Treatments are administered daily for six days by subcutaneous injection in 0.5 cc. of vehicle (.5% carboxymethyl cellulose, .4% Tween 80, .9% sodium chloride and 10% carbowax 300 in distilled water). Autopsies are performed on the seventh day. The data are analyzed by analysis of variance and significance of treatment differences determined by the use of Dunnett's method of multiple comparisons to a control.

| Compound | Effective dose, mg./rat/day |
|---|---|
| 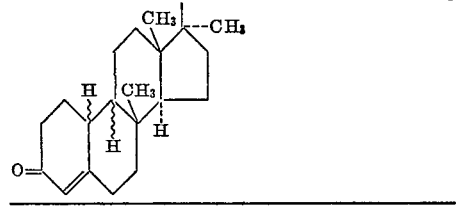 | 1 |

I claim:
1. A compound of the formula:

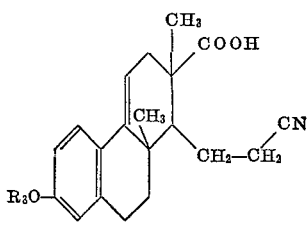

wherein $R_3$ is a lower alkyl of from 1 to 4 carbon atoms.
2. A compound in accordance with claim 1, wherein $R_3$ is methyl.

3. A method of preparing a compound of the formula:

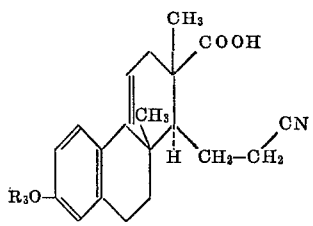

wherein $R_3$ is a lower alkyl group of from 1 to 4 carbon atoms which comprises heating at a temperature within the range of 37° C. to 75° C. a compound of the formula:

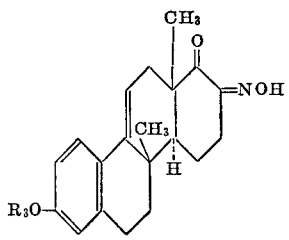

wherein $R_3$ is as defined above, with an oximinotosyl halide in the presence of a strong base selected from the group consisting of sodium hydroxide and potassium hydroxide and a water miscible ether.

References Cited
UNITED STATES PATENTS
3,578,705  5/1971  Wendler et al. ____ 260—465 D JOSEPH P. BRUST, Primary Examiner U.S. Cl. X.R.
260—346.2 M, 397.4, 397.45, 397.5, 488, 520, 566 A, 576, 586, 590; 424—304, 342, 343